(12) United States Patent
Corcoran et al.

(10) Patent No.: US 7,765,699 B2
(45) Date of Patent: Aug. 3, 2010

(54) TRUCK CAB SPACE FRAME

(75) Inventors: Brian Corcoran, Oxford, MI (US);
Richard Ashley, Gaylord, MI (US)

(73) Assignee: Magna International Inc., Aurora, Ontario (CA)

( * ) Notice: Subject to any disclaimer, the term of this patent is extended or adjusted under 35 U.S.C. 154(b) by 1277 days.

(21) Appl. No.: 11/206,043

(22) Filed: Aug. 18, 2005

(65) Prior Publication Data

US 2005/0274017 A1 Dec. 15, 2005

Related U.S. Application Data

(62) Division of application No. 10/491,242, filed on Mar. 30, 2004.

(60) Provisional application No. PCT/US02/031248, filed on Oct. 1, 2002, now Pat. No. 6,948,768, provisional application No. 60/326,211, filed on Oct. 2, 2001.

(51) Int. Cl.
*B21D 22/10* (2006.01)
*B21D 47/00* (2006.01)
*B23P 17/00* (2006.01)
*B62D 21/00* (2006.01)
*B62D 21/03* (2006.01)

(52) U.S. Cl. .................. 29/897.2; 29/897; 29/421.1; 72/61; 296/193.06; 296/205; 280/781; 280/798

(58) Field of Classification Search .............. 29/421.1, 29/897, 897.2; 72/61; 296/205, 193.06, 296/146.9; 280/781, 798
See application file for complete search history.

(56) References Cited

U.S. PATENT DOCUMENTS 3,055,699 A 9/1962 May
(Continued)

FOREIGN PATENT DOCUMENTS

JP 10-100945 4/1998
(Continued)

OTHER PUBLICATIONS

Wolf et al., "Mercedes-Benz Econiceine Innovative Fahrgestell-loesung Fuer Sonderfahrzeuge," ATZ Automobiltechnische Zeitschrift, Franckh'sche Verlagshandlung, 100(9):592-595 (1998), Stuttgart, Germany.

*Primary Examiner*—David P Bryant
*Assistant Examiner*—Alexander P Taousakis
(74) *Attorney, Agent, or Firm*—Pillsbury Winthrop Shaw Pittman LLP

(57) ABSTRACT

A method of forming a space frame for a cab, including forming each of a pair of hydroformed, longitudinally extending inner side rails, a hydroformed connecting member, a hydroformed first upper cross member, each of a pair of hydroformed upper longitudinal members, and each of a pair of hydroformed A-pillar members. The method including, providing a tubular metallic blank having a tubular metallic wall. The method also including placing the tubular metallic blank into a die cavity of a die assembly, the die cavity having die surfaces, and providing a high pressure fluid into an interior of the blank to expand the metallic wall of the central portion of the blank outwardly into conformity with the surfaces of the die cavity to define the respective hydroformed member. The method further including mounting the connecting member to each of the inner side rails, and mounting the first upper cross member to said connecting member; mounting each of the upper longitudinal members to the first upper cross member; and mounting each of the A-pillar members to one of the upper longitudinal members.

10 Claims, 14 Drawing Sheets

U.S. PATENT DOCUMENTS

| | | | |
|---|---|---|---|
| 4,660,345 A * | 4/1987 | Browning | 52/653.2 |
| 4,813,736 A | 3/1989 | Schubert et al. | |
| 4,840,423 A | 6/1989 | Maekawa | |
| 4,978,163 A | 12/1990 | Savio | |
| 5,213,386 A | 5/1993 | Janotik et al. | |
| 5,332,281 A | 7/1994 | Janotik et al. | |
| 5,458,393 A | 10/1995 | Benedyk | |
| 5,460,026 A | 10/1995 | Schafer | |
| 5,549,352 A | 8/1996 | Janotik et al. | |
| 5,855,394 A | 1/1999 | Horton et al. | |
| 5,953,945 A | 9/1999 | Horton | |
| 6,016,603 A | 1/2000 | Marando et al. | |
| 6,092,865 A | 7/2000 | Jaekel et al. | |
| 6,099,039 A | 8/2000 | Hine | |
| 6,260,912 B1 | 7/2001 | Mondragon Sarmiento et al. | |
| 6,282,790 B1 | 9/2001 | Jaekel et al. | |
| 6,315,351 B1 | 11/2001 | Mondragon Sarmiento et al. | |
| 6,416,119 B1 | 7/2002 | Gericke et al. | |
| 6,513,242 B1 * | 2/2003 | Christofaro et al. | 29/897.2 |
| 6,533,348 B1 * | 3/2003 | Jaekel et al. | 296/205 |
| 6,543,840 B2 | 4/2003 | Colliar et al. | |
| 6,623,067 B2 * | 9/2003 | Gabbianelli et al. | 296/205 |
| 6,742,258 B2 * | 6/2004 | Tarbutton et al. | 29/897 |
| 6,824,204 B2 | 11/2004 | Gabbianelli et al. | |
| 6,957,845 B2 * | 10/2005 | Rager | 296/146.9 |
| 6,978,545 B2 * | 12/2005 | Marando | 29/897.2 |
| 7,325,866 B2 * | 2/2008 | Horton et al. | 296/205 |
| 2001/0002760 A1 | 6/2001 | Gabbianelli et al. | |
| 2002/0149189 A1 * | 10/2002 | Barber et al. | 280/781 |

FOREIGN PATENT DOCUMENTS

| | | |
|---|---|---|
| WO | WO 99/20516 | 4/1999 |

* cited by examiner

US 7,765,699 B2

TRUCK CAB SPACE FRAME

This application is a divisional application of U.S. patent application Ser. No. 10/491,242, filed Mar. 30, 2004, now U.S. Pat. No. 6,948,768, which is the National Phase of International Application PCT/US02/31248 filed Oct. 1, 2002 (which designated the U.S. and that International Application was published in English under PCT Article 21(2) on Apr. 10, 2003, as International Publication Number WO03/029069A2), which claims the benefit of U.S. Provisional Application Ser. No. 60/326,211, filed on Oct. 2, 2001. The entire contents of each of these applications are hereby incorporated herein by reference thereto, respectively.

FIELD OF THE INVENTION

The present invention is generally related to motor vehicle frames and more particularly to motor vehicle space frames constructed using hydroformed members.

BACKGROUND OF THE INVENTION

The cab assembly for a truck is a box-like structure that provides an enclosed driver compartment at the front of the truck for a driver. Truck cabs are generally mounted on the truck frame. The cab assembly can include a pair of windowed side doors, a front windshield, seats for the driver and a passenger, an instrument panel, and vehicle controls.

The front end of the cab assembly is pivotally mounted on the frame so the cab assembly can move between an operative position and an open position with respect to the frame. In its operative position, the cab assembly is releasably latched to the frame. The rearward end of the unlatched cab assembly can be pivoted generally upwardly and forwardly away from the frame to the open cab assembly position to allow access to the engine and related components. Truck cabs are most commonly constructed of stamped and/or roll formed parts that are welded together.

Examples of prior art truck cabs can be found in U.S. Pat. Nos. 6,260,912 to Mondragon Sarmiento; U.S. Pat. No. 4,978,163 to Savio, and U.S. Pat. No. 3,055,699 to May, the entire disclosures of which are incorporated herein by reference thereto.

SUMMARY OF THE ILLUSTRATED EMBODIMENT OF THE INVENTION

The illustrated embodiment providing, among other things, a method of forming a space frame for a cab, comprising forming each of the pair of hydroformed, longitudinally extending inner side rails, hydroformed connecting member, and first upper cross member by a method comprising, providing a tubular metallic blank having a tubular metallic wall; placing the tubular metallic blank into a die cavity of a die assembly, the die cavity having die surfaces, and providing a high pressure fluid into an interior of the blank to expand the metallic wall of the central portion of the blank outwardly into conformity with the surfaces of the die cavity to define the respective hydroformed member; mounting the connecting member to each of the inner side rails; and mounting the first upper cross member to the connecting member.

Other aspects, features, and advantages of the present invention will become apparent from the following detailed description of the illustrated embodiment, the accompanying drawings, and the appended claims.

DETAILED DESCRIPTION OF THE ILLUSTRATED EMBODIMENT OF THE INVENTION

Figure 9:
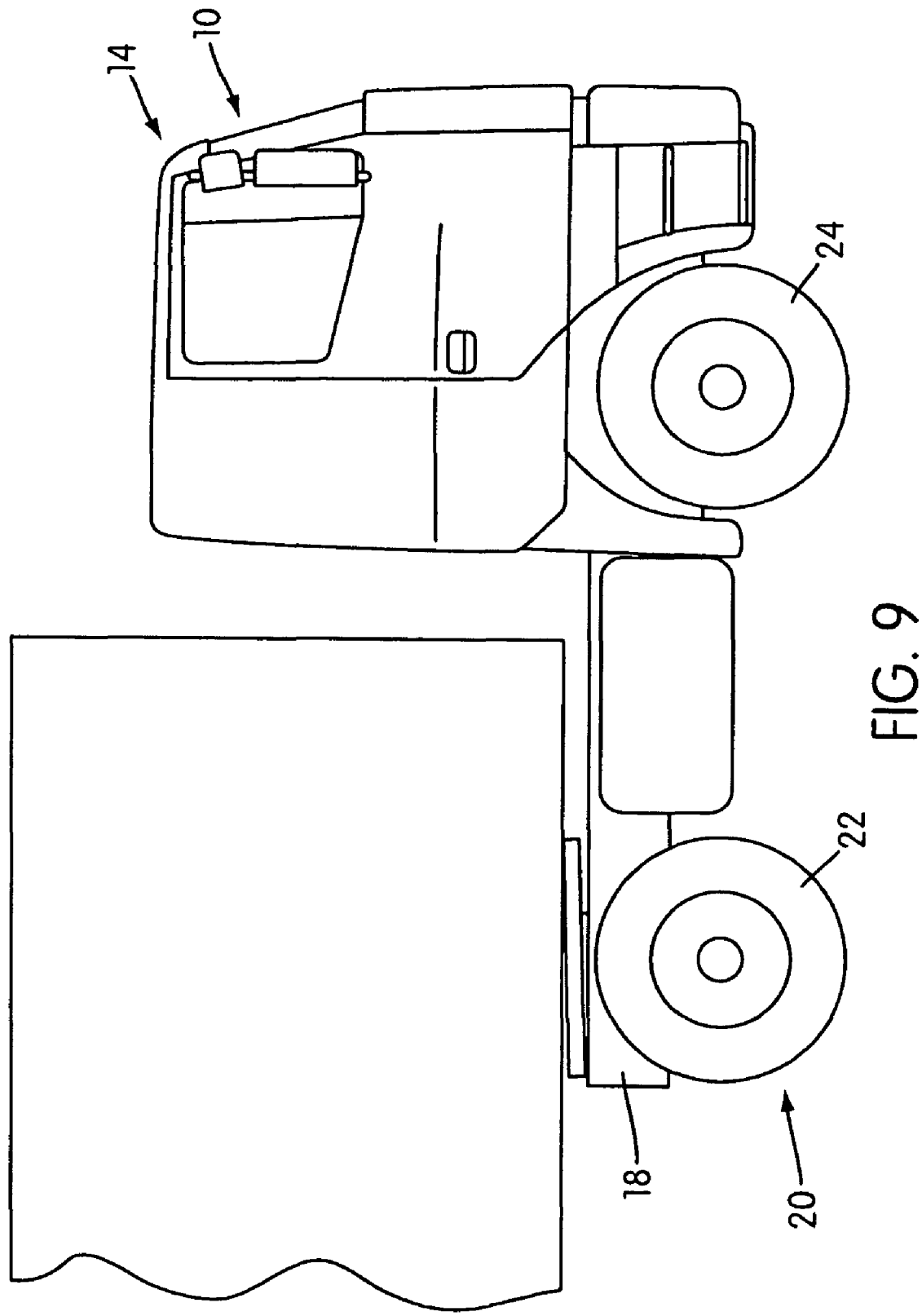
FIG. 9 is a schematic side elevational view showing a truck that includes the cab assembly of FIG. 1 and showing of a portion of a trailer attached to the truck.
Figure 10:
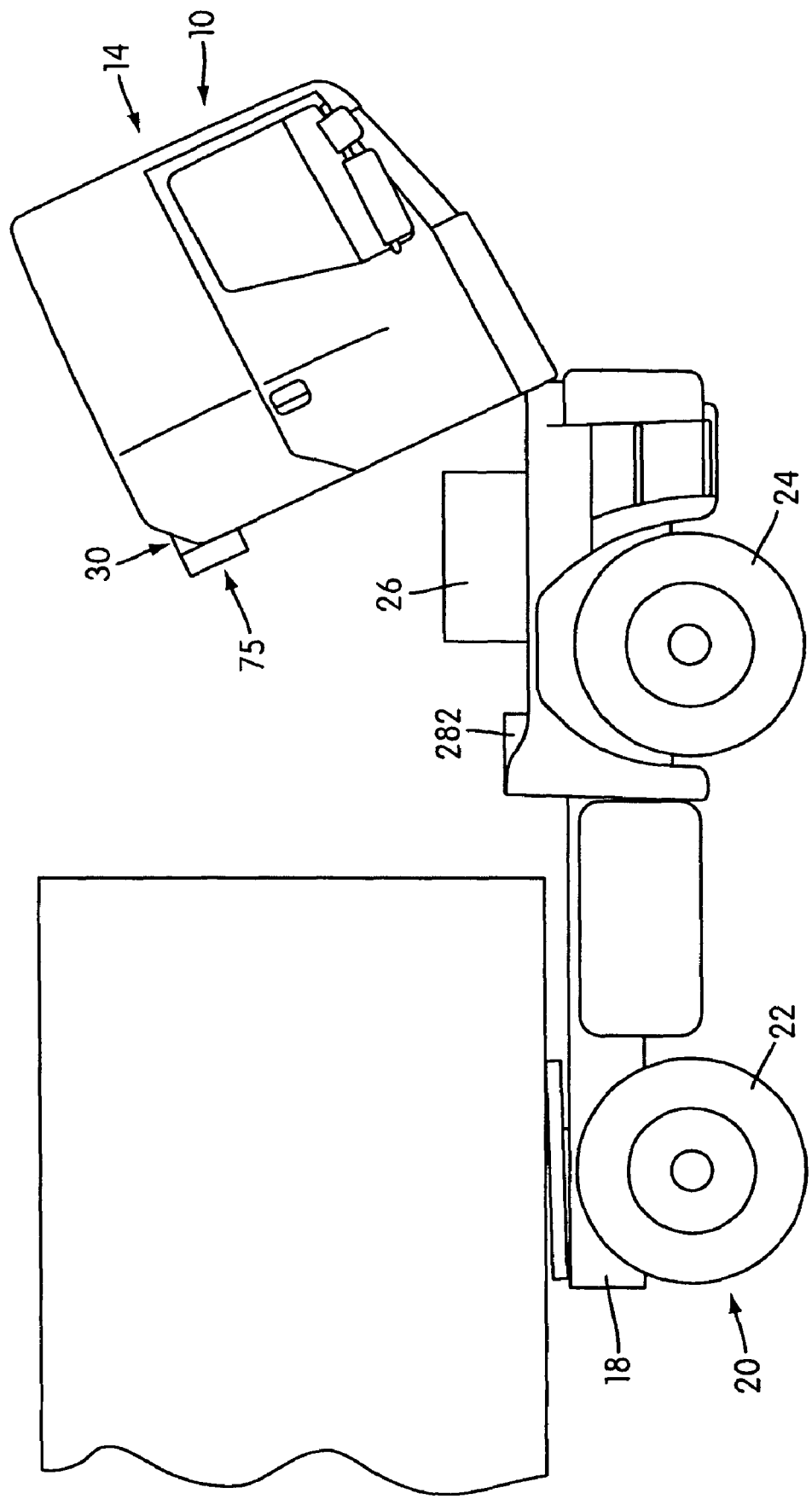
FIG. 10 is a view similar to FIG. 9 except showing the cab assembly in an open position.

FIGS. 1-4 illustrate various stages of the construction of an example cab assembly 10 (FIG. 1) constructed according to one embodiment of the present invention. The illustrated embodiment is preferably for a trailer-towing truck. The cab assembly 10 generally includes a space frame 12 and a plurality of body panel structures mounted on the space frame 12. The construction of the cab assembly 10 is illustrated in FIGS. 1-8. A schematic representation of an assembled truck 14 that includes an assembled cab assembly 10 is shown in FIGS. 9 and 10. The cab assembly 10 provides a cab portion of the truck 14.

The example space frame 12 of the cab assembly 10 is primarily of hydroformed construction, but some non-hydroformed components may also be incorporated in the space frame 12. As discussed below, other space frame embodiments constructed according to the principles of the invention may be entirely of hydroformed construction.

The use of tubular hydroforming in the illustrated embodiment enables, for example, increased control frame stiffness, dimensional accuracy, fatigue life, and vehicle crashworthiness while reducing frame mass and cost (relative to frames constructed using conventional, non-hydroformed techniques).

Tubular hydroforming is a metal-forming process which may use, for example, a high-pressure fluid to outwardly expand a tubular metal blank into conformity with the surfaces of a die cavity of a die assembly to form an irregularly shaped tubular part. Because the shape of the die cavity determines the shape of the part, tubular hydroformed members may therefore be provided with a wide range of geometries in comparison with other methods of forming parts. Each tubular hydroformed frame member may be formed to have a cross-sectional configuration that varies continuously along its length, to the configuration desired and each frame member may be formed to curve or "bend" along its length to define different portions of a vehicle frame such as frame side rails and frame pillars in a single tubular hydroformed part.

Forming the parts by hydroforming provides the opportunity to replace several stamped parts of existing stamped frames with single hydroformed parts. When this is accomplished in a vehicle frame that has been heretofore of stamped construction, for example, an existing vehicle frame design could be made lighter, stronger and at a reduced cost because, for example, fewer parts would be required to construct the frame, fewer machines would be required during manufacturing, fewer welds would be required, less material would be used, and so on.

The example space frame 12 of the cab assembly 10 is primarily of hydroformed construction, but some non-hydroformed components are also incorporated in the space frame 12. As discussed below, other space frame embodiments constructed according to the principles of the invention may be entirely of hydroformed construction.

As seen in FIG. 9, the truck 14 includes a truck frame assembly 18 and a plurality of wheels 20 mounted on the frame assembly 18 by suspension assemblies (not shown). The wheels 20 rollingly support the frame assembly 18 and include a set of driveable rear wheels 22 and a set of steerable front wheels 24. An engine assembly 26 (shown schematically in FIG. 10) is mounted on the frame assembly 18 and is operatively connected to the rear wheels 22 for powered movement of the same to move the truck 14. A steering assembly (not shown) is mounted in a cab portion of the cab assembly 10 and is operatively connected to the front wheels 24 to steer the moving truck 14. The cab assembly 10 is mounted on the frame assembly 18 for movement between an operative position (see FIG. 9) in which the cab assembly 10 is releasably latched to the frame assembly 18 and a raised position (see FIG. 10) in which the cab assembly 10 is unlatched from the frame assembly 18 and moved upwardly with respect thereto to provide access to the engine assembly 26.

Space frames for any size cab assembly may be constructed utilizing the principles of space frame construction taught by the example space frame 12. For example, a space frame may be constructed according to the teachings of the invention to have sufficient length (longitudinally) to include a rear sleeper compartment or a space frame may be constructed according to the teachings of the invention to have a lesser longitudinal length so that the cab assembly does not include a sleeper compartment.

The space frame 12 incorporates a significant number of tubular hydroformed components which allows the vehicle manufacturer to realize the benefits offered by tubular hydroforming technology (relative to stamped and welded frame construction or roll formed construction, for example) such as reduction of frame weight, improved vehicle crashworthiness, reduction in the number of frame parts required to construct the frame, reduction in the number of welds required join the parts to one another (and therefore in the total number of welds required to assemble the space frame 12), reduction in the amount of waste generated during manufacturing of the individual frame components, and so on. The example space frame 12 may utilizes non-hydroformed components (specifically, a pair of stamped sheet metal forward pillar assemblies) to facilitate construction of the space frame 12 as described below. These and other aspects of the tubular hydroformed construction of the space frame 12 will become apparent as the space frame 12 is considered in detail. Hydroformed space frames are generally known as can be understood from commonly assigned U.S. Pat. No. 6,092,865 to Jaekel et al., for example, which is incorporated herein by reference in its entirety.

Figure 2:
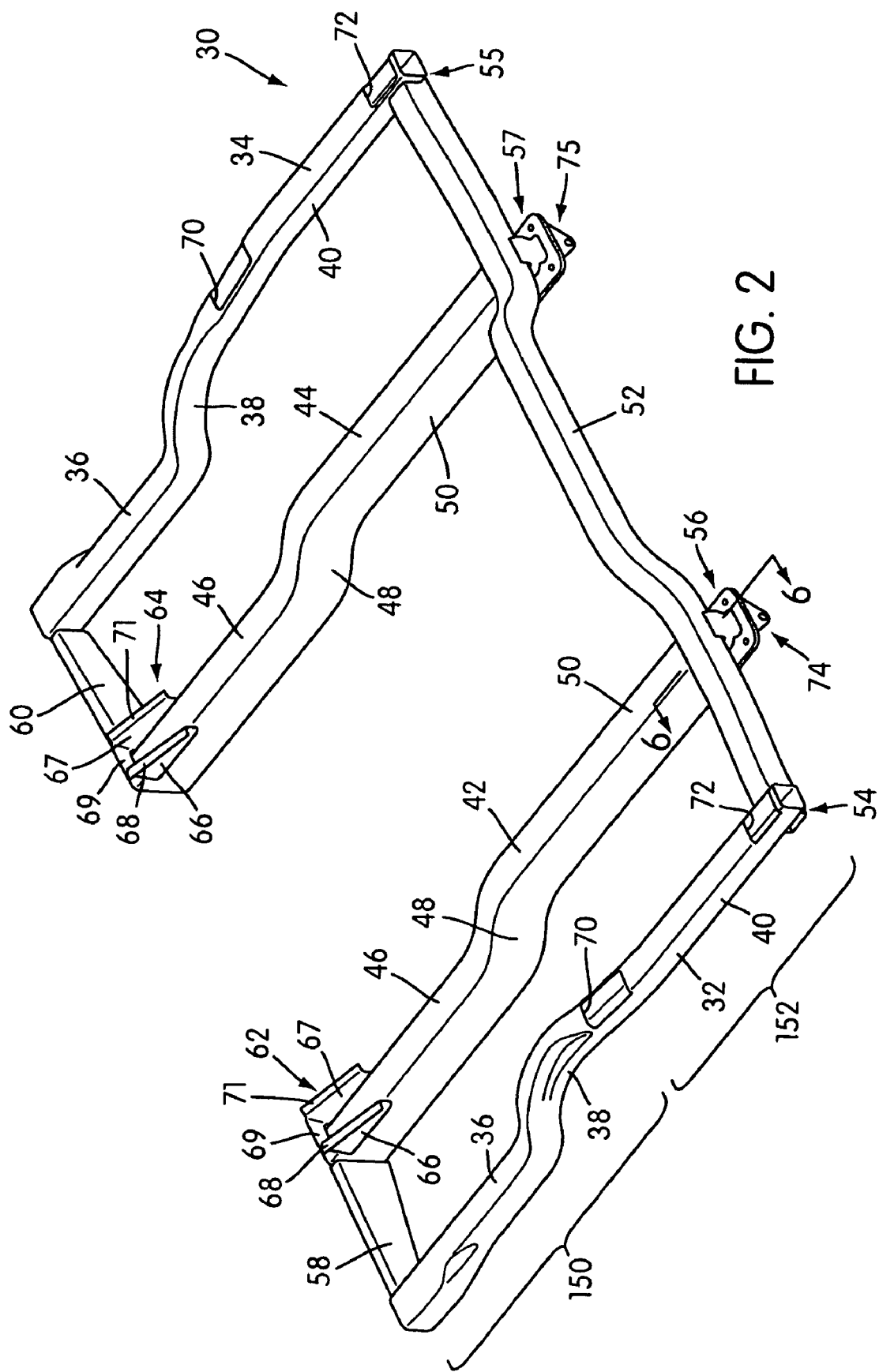
FIG. 2 is a perspective view of a lower frame assembly of the space frame of FIG. 1.

FIG. 2 shows a lower frame assembly 30 of the space frame 12 in isolation. The lower frame assembly 30 includes a pair of longitudinally extending, laterally spaced outer side rail members 32, 34 and a pair of inner side rail members 42, 44 of tubular hydroformed construction. Because the outer side rail members 32, 34 are of mirror image construction to one another and because the inner side rail members 42, 44 are of mirror image construction to one another, only rail members 32 and 42 will be discussed in detail, but the discussion applies equally to rail members 34 and 44, respectively. Corresponding portions of rail members 32 and 34 and of rail members 42 and 44 are labeled with identical reference numbers to facilitate discussion, but it is understood that these corresponding portions are of mirror image construction.

The example rail member 32 is of one-piece tubular hydroformed construction and includes a forward rail section 36, an upwardly angled intermediate rail section 38 and an essentially straight rearward section 40. The inner side rail members 42, 44 are of one-piece tubular hydroformed construction and are positioned generally between the outer side rail members 32, 34. Each inner side rail member 42, 44 includes a forward rail section 46, an upwardly angled intermediate section 48 and an essentially straight rearward rail section 50.

Each hydroformed member 32, 34, 42, 44 is preferably a tubular structure having a closed cross-section along its length and open tubular ends. Each member 32, 34, 42, 44 are hydroformed to have a continuously varying cross-section along its length, so that the exact shape of the cross section and the cross-sectional area of each member varies along its length as shown, for example, in FIG. 2. A portion of an upper wall of each outer side rail member 32, 34 is cut out (by laser cutting, for example, or by other appropriate method) and removed from each member in two locations to provide a pair of pillar-receiving openings 70, 72 in each member 32, 34. The openings 70, 72 received lower end portions of the B and C pillars, respectively, as described below.

A laterally extending connecting structure in the form of a rearward tubular hydroformed member 52 is connected to a rearward end portion of each of the outer side rail members 32, 34 and each of the inner side rail members 42, 44 at joints 54, 55, 56, 57, respectively. The member 46 holds the pair of outer side rail members 32, 34 in laterally spaced relation to one another and holds the inner side rail members 42, 44 in laterally spaced relation to each other and to the outer side rail members 32, 34.

Figure 5:
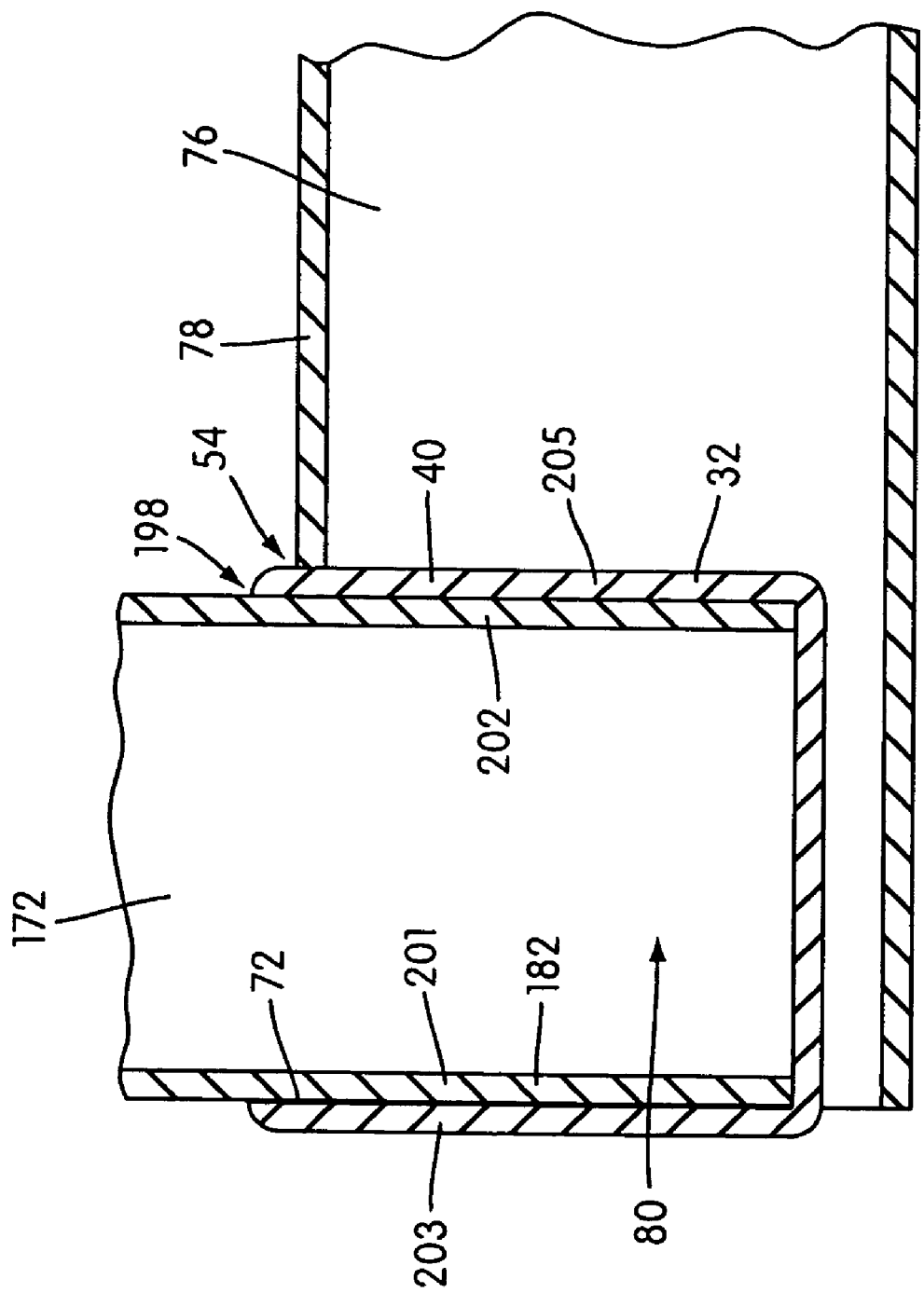
FIG. 5 is a cross sectional view of a pair of space frame joints taken through the line 5-5 of FIG. 4.

The construction of joint 54 can be understood from FIG. 5. Joint 55 is of mirror image construction and consequently is not separately discussed. Sections of the vertically extending sidewalls 76 (only one of which is shown in FIG. 5) and a section of the top wall portion 78 of the rearward member 52 are cut out and removed to form a notch 80 in the end of member 52. The outer side rail member 32 is secured in the notch 80 by welding (MIG welding, for example) or other appropriate fastening method.

Figure 6:
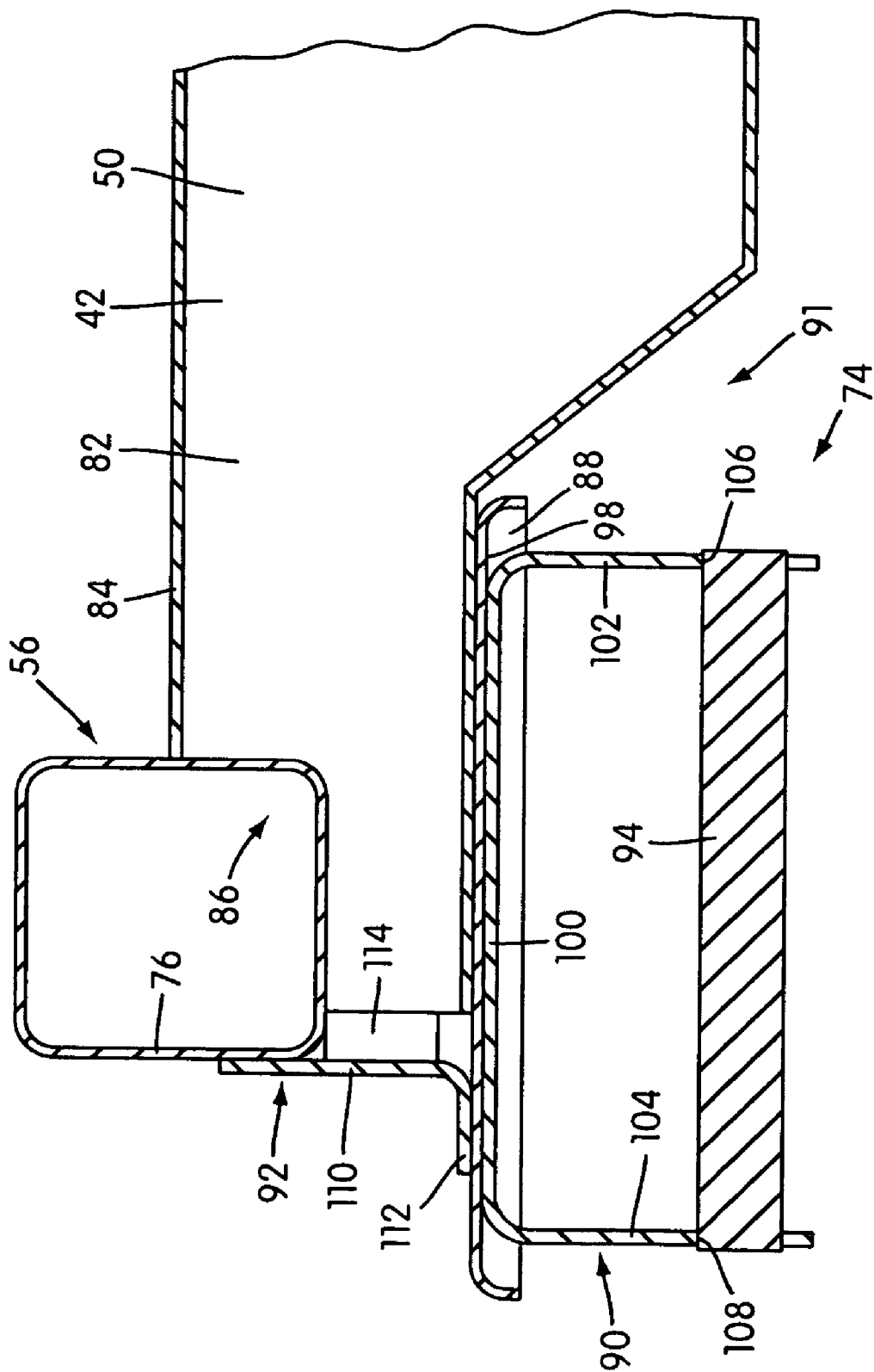
FIG. 6 is a cross sectional view of a rear attachment bracket assembly taken through the line 6-6 of FIG. 2.

The construction of joint 56 can be understood from FIG. 6. Sections of the vertically extending sidewalls 82 (only one of which is shown in FIG. 6) and a section of the top wall 84 of the inner side rail member 42 are cut out and removed to form a notch 86 in the inner side rail member 42. The rearward member 52 is secured within the notch 86 by welding or by other suitable method. The walls 76, 78 of the hydroformed member 52 and the walls 82, 84 of the hydroformed member 42 may be cut using a laser or by any other appropriate method.

Forward laterally extending connecting structure in the form of a pair of mounting structures 58, 60 is connected between a forward end portion of each outer side rail member 32, 34 and the associated inner side rail member 42, 44, respectively. The example mounting structures 58, 60 are constructed of a metal material and are secured to opposing side surfaces of the members 32, 42 and 34, 44, respectively, by welding, for example, or by other suitable joining technique. The mounting structures 58, 60 provide support structure for brackets (not shown) that are used to pivotally mount the cab assembly 10 to the truck frame assembly 18, as seen in FIG. 10.

As seen in FIG. 2, a pair of floor support structures 62, 64 are mounted on the forward rail sections 46 of each inner side rail member 42, 44. Each support structure 62, 64 may be a stamped sheet metal structure that includes opposing vertical wall sections 66, 67 and a connecting wall 69. A lower portion of the vertical wall sections 66, 67 of each support structure 62, 64 is secured to a respective side surface of the associated inner side rail member 42, 44 by welding or other appropriate method. Each wall section 66, 67 includes a flange 68, 71. Each flange 68, 71 provides an upwardly facing angled support surface that supports a forward end portion of a floor structure 73 (shown in FIG. 3, for example) of the cab assembly 10.

A pair of rear attachment bracket assemblies 74, 75 are connected to rearward portions of the pair of inner side rail members 42, 44, respectively. FIG. 6 shows the construction of the rearward attachment bracket assembly 74. The structure of bracket assembly 75 can be understood from the description of the bracket assembly 74. The rearward attachment bracket assembly 74 includes a bracket attachment structure 88, a mounting bracket 90, a support structure 92, and a latch engaging member 94. The bracket attachment structure 88, the mounting bracket 90 and the support structure 92 may be made from a metallic material of suitable strength and may be shaped by stamping. The inner side rail member 42 is shaped (by cutting or other appropriate method) to have a notch 91. The bracket attachment structure 88 is secured by welding or other appropriate method within the notch 91 of the inner side rail member 42. The attachment structure 88 provides a relatively wide (relative to the width of the inner side rail member 42) downwardly facing surface 98 to which the mounting bracket 90 is attached. The mounting bracket 90 includes a top wall 100 and a pair of downwardly extending forward and rearward walls 102, 104. An upwardly facing surface of the wall 100 is secured to the downwardly facing surface 98 of the attachment structure 88 by welding or other appropriate method.

The latch engaging member 94 is secured by welding or other appropriate method in openings 106, 108 formed in the wall portions 102, 104, respectively, of the mounting bracket 90. The latch engaging member 94 in the example bracket assembly 74 is an elongated cylindrical structure made of a metallic material. The support structure 92 has an L-shaped cross-section that includes a vertically extending wall portion 110 and a horizontally extending wall portion 112. The support structure 92 is secured to the space frame by welding or other suitable method. Specifically, the wall portion 110 is secured to a wall portion 76 of the tubular hydroformed cross member 52. The wall portion 112 of the support structure 92 is secured to the attachment structure 88. A pair of flanges (only one is visible in FIG. 6) are secured to respective vertically extending sides of the inner side rail member 42. The support bracket 92 helps secure the bracket assembly 74 to the space frame members 52, 42 and also covers the open tubular end of the inner side rail member 42.

As shown in FIGS. 1-6, a plurality of the cab assembly components are secured to the lower frame assembly 30 including floor pan structures and a pair of forward pillar assemblies. Each of these cab assembly components may be non-hydroformed. In the example cab assembly 10, each of these components is constructed of stamped sheet metal.

Figure 3:
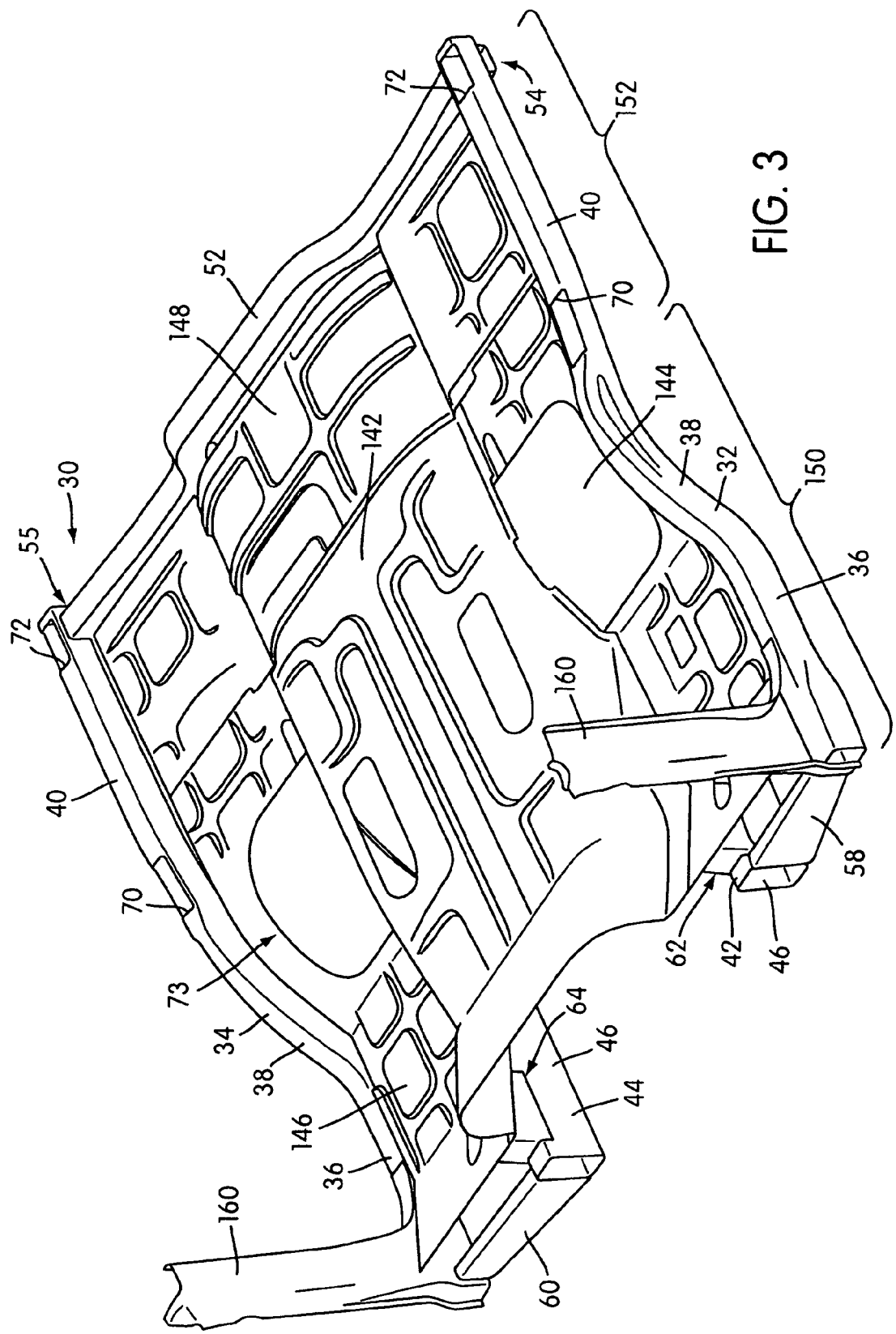
FIG. 3 is a perspective view of the lower frame assembly with a floor structure and portions of a pair of forward pillar assemblies mounted thereon of the space frame of FIG. 1.

As best seen in FIG. 3, the cab assembly 10 has a multi-piece floor structure (although the floor structure could be of single-piece construction in some embodiments of the cab assembly) that includes a central floor pan structure 142, a pair of side floor pan structures 144, 146 and a laterally extending rear floor pan structure 148. The side floor pan structures 144, 146 are secured to portions of the two pairs of side rail members 32, 42 and 34, 44, respectively. A forward portion of each side floor pan structure 144, 146 is supported by the pair of support structures 62, 64 mounted on the rail members 42 and 44.

A rearward portion of the central floor pan structure 142 is secured to and supported by the inner side rail members 42, 44. A forward portion of the central floor pan structure 142 is secured to the support structures 62, 64. The longitudinally extending side edge portions of the central floor pan structure 142 are secured to adjacent longitudinally extending side edge portions of the side floor pan structures 144, 146. The rear floor pan structure 148 extends laterally between the outer side rail members 32, 34 and is secured to rearward portions of the outer side rail members 32, 34, to a forwardly facing side surface of the rearward member 52 and to portions of the inner side rail members 42, 44.

The forward rail sections 36, 46, the intermediate rail sections 38, 48 and a forward portion of the rearward sections 40, 50 of the outer and inner side rail members 32, 34 and 42, 44, respectively, generally define the longitudinal extent of a cab portion 150 of the cab assembly. The rearward portion of each of the rearward sections 40, 50 of the outer and inner side rail members generally define the longitudinal extent of a rear compartment portion 152 of the cab assembly. As explained below, the rear compartment portion 152 of the cab assembly 10 can be constructed for use as a storage compartment or can be constructed to be a sleeper compartment that includes one or more beds.

A pair of forward pillar structures 154, 156 are mounted on a lower frame assembly 30. The forward pillar structures of the example space frame include a pair of forward pillar assemblies 154, 156 (partially shown in FIG. 3 and one of which, 154, is shown in cross sectional and exploded views in FIGS. 7 and 8, respectively, for example). The forward pillar assemblies 154, 156 are of mirror image construction to one another in the example space frame 12 and can be of stamped sheet metal construction. Because of the mirror image construction, only assembly 154 is considered in detail. Each forward pillar assembly 154, 156 is connected to a respective outer side rail member 32, 34 and extends upwardly therefrom. As explained below, each forward pillar assembly 154, 156 provides a lower portion of the forwardmost or A pillar on each side of the space frame 12.

Figure 7:
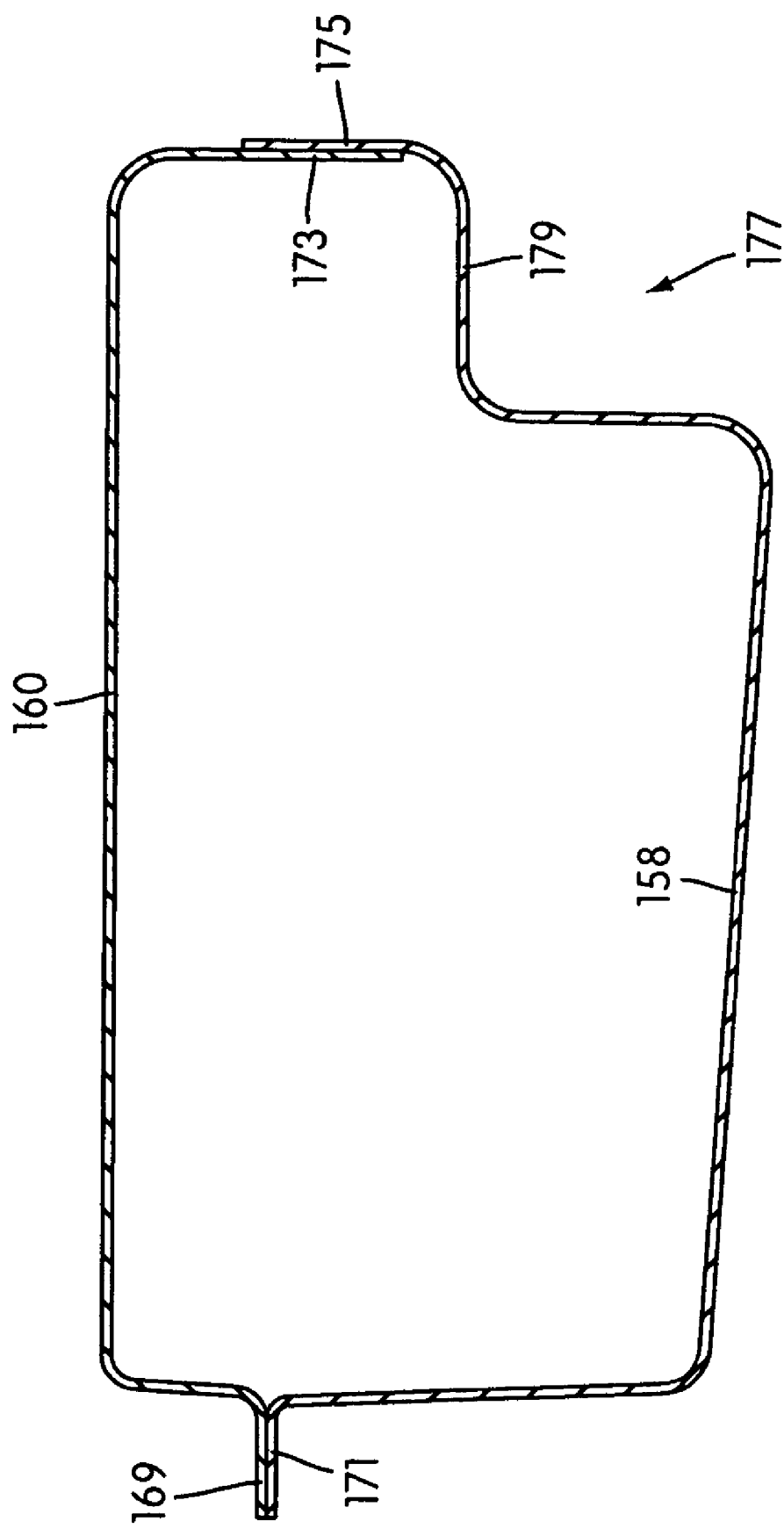
FIG. 7 is a cross sectional view taken through the line 7-7 as indicated in FIG. 4.
Figure 8:
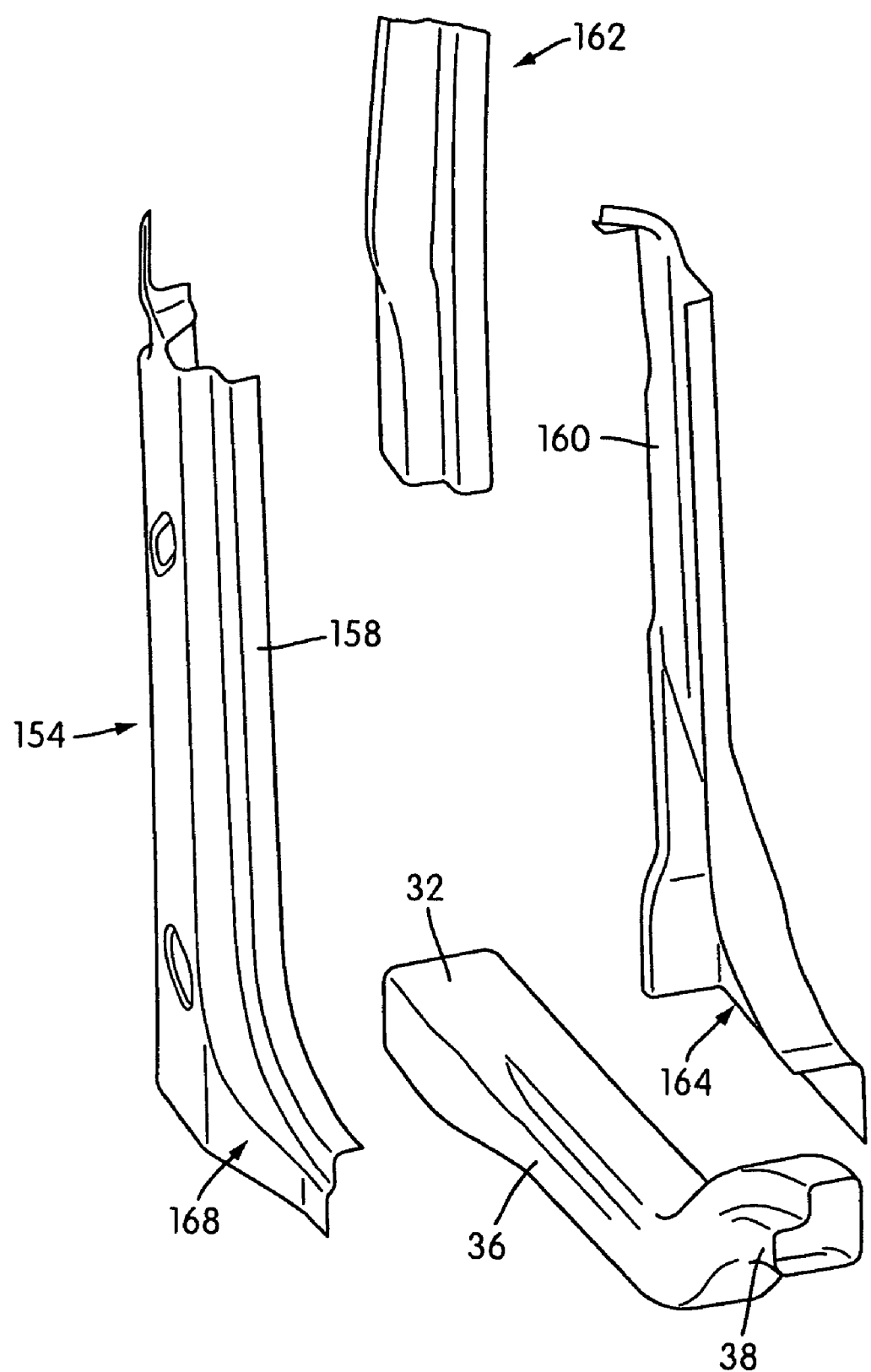
FIG. 8 is an exploded view showing a forward pillar assembly of the space frame of the cab assembly of FIG. 1 and showing fragmentary portions of a pair of hydroformed members of the space frame of FIG. 1.

The construction of the forward pillar assembly 154 and the manner in which the components of the pillar assembly 154 and the outer side rail member 34 are connected to one another can be understood from, for example, FIGS. 3, 4, 7 and 8. The forward pillar assembly 154 includes an outer pillar member 158 and an inner pillar member 160. FIG. 8 shows a fragmentary portion of the forward rail section 36 of the outer side rail member 34, the inner and outer pillar members 158, 160, and a fragmentary portion of an upper longitudinal member 162 (described below) of the space frame 12 in exploded relation with one another. The inner and outer pillar members 158, 160 may be stamped sheet metal structures that are secured to one another and to the tubular hydroformed outer side rail member 32 by welding, or by any appropriate method.

A lower portion 164 of the inner pillar member 160 is secured to the outer side rail member 32 by welding or other appropriate method. A lower portion 168 of the outer pillar member 158 is secured to the outer side rail member 32. Upper portions of the outer and inner pillar members 158, 160 are secured to one another in the assembled space frame 12. A forward end portion of the upper longitudinal member 162 is secured between the outer and inner pillar members 158, 160 in the assembled space frame 12.

The upper longitudinal member 162 may be secured to the inner pillar member 160 before the outer pillar member 158 is secured to the inner pillar member 160 and the upper longitudinal member 162 or, alternatively, the space frame may be assembled by securing the outer and inner pillar members 158, 160 to one another and then securing the free end of the upper longitudinal member 162 therebetween.

Each forward pillar assembly 154, 156 has a closed, tube-like cross section (see FIG. 7, for example). The inner and the outer pillar members 160, 158 each include an outwardly extending wall portion 169, 171, respectively, that are secured to one another (by welding, for example) in overlapping, abutting engagement. Wall portions 173, 175 of the inner and outer pillar members 160, 158, respectively, are secured to one another (by welding, for example) in overlapping, abutting engagement. The tubular construction of the forward pillar assemblies 154, 156 provides the A pillars with a high degree of strength. The outer pillar member 158 includes a recess 177 shaped to receive a peripheral portion of a vehicle door (not shown). The recess 177 includes an outwardly facing wall surface 179 constructed and arranged to engage a door seal (not shown) to seal the closed vehicle door.

The forward pillar assemblies 154, 156 and a plurality of upper tubular hydroformed members comprise an upper frame assembly 181 that is mounted on the lower frame assembly 30 to provide the upper portion of the space frame 12. The upper tubular hydroformed members include the pair of upper longitudinal members 162, 163, a tubular hydroformed U-shaped intermediate member 170 and a tubular hydroformed U-shaped rear member 172. The assembled upper frame assembly 181 forms a cage-like structure that supports a plurality of body panels in the assembled cab assembly 10.

Figure 4:
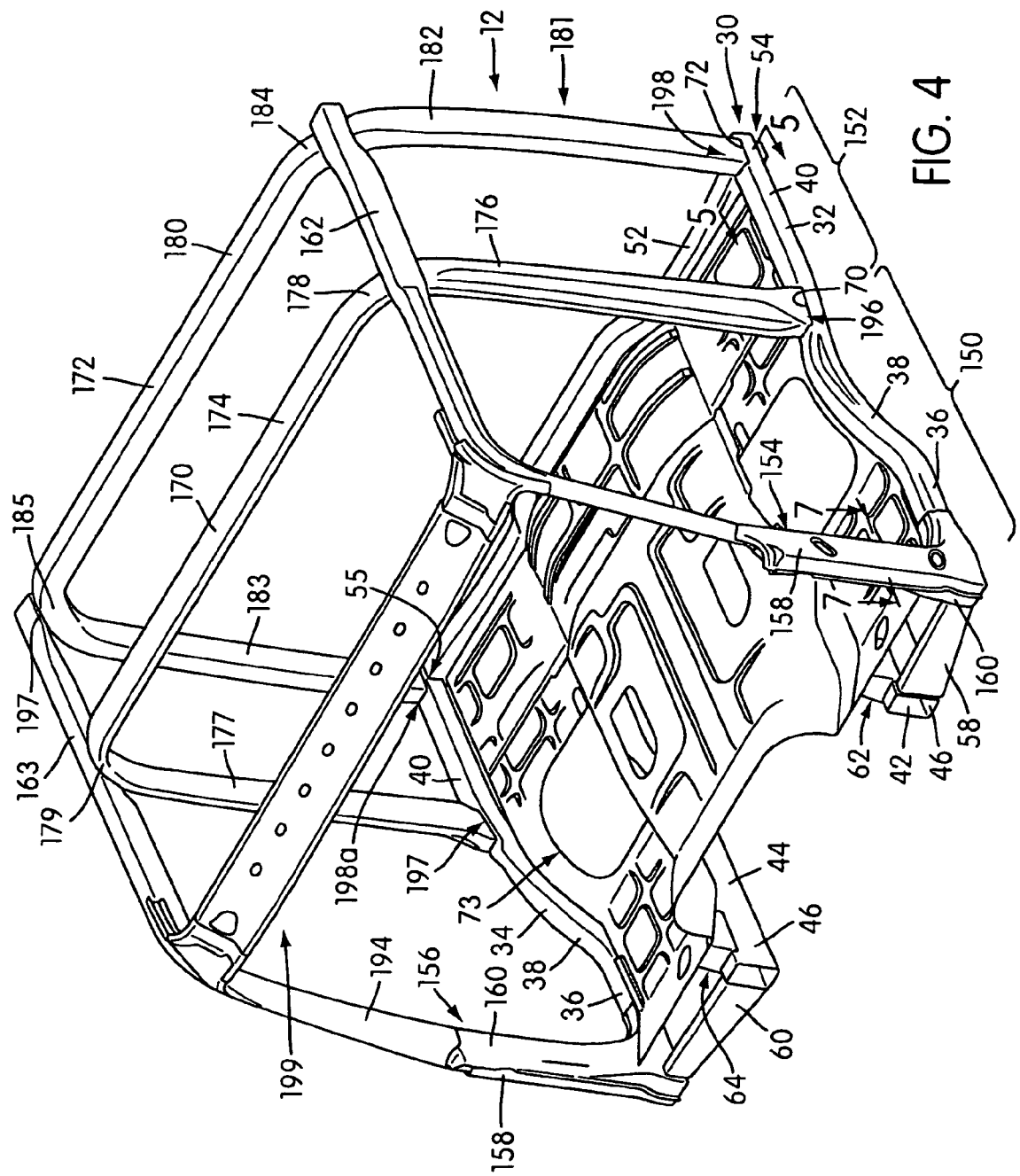
FIG. 4 shows the lower frame assembly of FIG. 3 with an upper portion of the space frame, including the assembled forward pillar assemblies, mounted thereon and showing an upper support structure mounted thereon.

As seen in FIG. 4, the intermediate member 170 is an inverted U-shaped hydroformed cross member having a central bight portion 174 and a pair of leg portions 176, 177 extending downwardly from junctures 178, 179 at respective opposite ends of the bight portion 174. The rear cross member 172 is another inverted U-shaped hydroformed cross member having a central bight portion 180 and a pair of leg portions 182, 183 extending downwardly from junctures 184, 185 at respective opposite ends of the bight portion 180.

A free end of each leg portion 176, 177 of the intermediate cross member 170 is connected (at joints 196, 197) to a respective outer side rail member 32, 34 to form one of a pair of intermediate pillar structures (which are the B pillars in the example space frame 12). The bight portion 174 of the intermediate cross member 170 provides attachment and support structure for a roof (not shown) of the assembled cab assembly 10.

A free end of each leg portion 182, 183 of the rear cross member 172 is connected (at joints 198, 198*a*) to a respective outer side rail member 32, 34 to form one of a pair of rear pillar structures (which are the C pillars in the example space frame 12). The bight portion 180 of the rear cross member 172 provides attachment and support structure for a roof (not shown) of the assembled cab assembly 10.

The joints 196, 197, 198, 198*a* are of similar construction and can be understood from the discussion of joint 198. Joint 198 is shown in cross section in FIG. 5. The opening 72 in the outer side rail member 32 is sized to receive a free end portion of the leg 182 of the cross member 172. When the leg 182 is placed through the opening 72, opposing outer surfaces of the wall portions 201, 202 of the leg 182 are in abutting engagement with inner surfaces of opposing, generally vertically extending wall portions 203, 205 of the outer side rail member 32. The leg portion 182 and the outer side rail member 32 may be secured together by, for example, welding (MIG welding, single side spot welding, and so on) or by any other suitable method.

As seen in FIG. 4, the upper longitudinal members 162, 163 are of mirror image construction in the example space frame 12. Therefore, only upper longitudinal member 162 is considered in detail. Corresponding portions of the two upper longitudinal members 162, 163 are designated with identical reference numbers for convenience of discussion.

The upper longitudinal member 162 includes a longitudinally extending rail-forming portion 192 and a pillar-forming portion 194. Generally, the rail-forming portion 192 of the upper longitudinal member 162 is secured in overlying relation to the cross members 170, 172 at joints 195, 197 and the free end of the pillar-forming portion 194 is secured to an upper portion of the forward pillar assembly 154. The pillar-forming portion 194 of the upper longitudinal member 162 and the associated forward pillar assembly 154 form an A pillar of the example space frame 12.

In the example space frame, the juncture 178 of the intermediate cross member 170 is welded or otherwise attached in surface-to-surface relation to an intermediate portion of the rail portion 192 of a respective upper longitudinal member 162. Similarly, the juncture 184 of the rear cross member 172 is welded or otherwise attached in surface-to-surface relation to a rearward portion of the rail-forming portion 192 of the upper longitudinal member 162. The rail-forming portion 192 is thus coupled to an upper portion of an associated rear pillar structure and extends forwardly therefrom to define a roof support rail that supports a portion of the roof of the assembled cab assembly 10.

Figure 1:
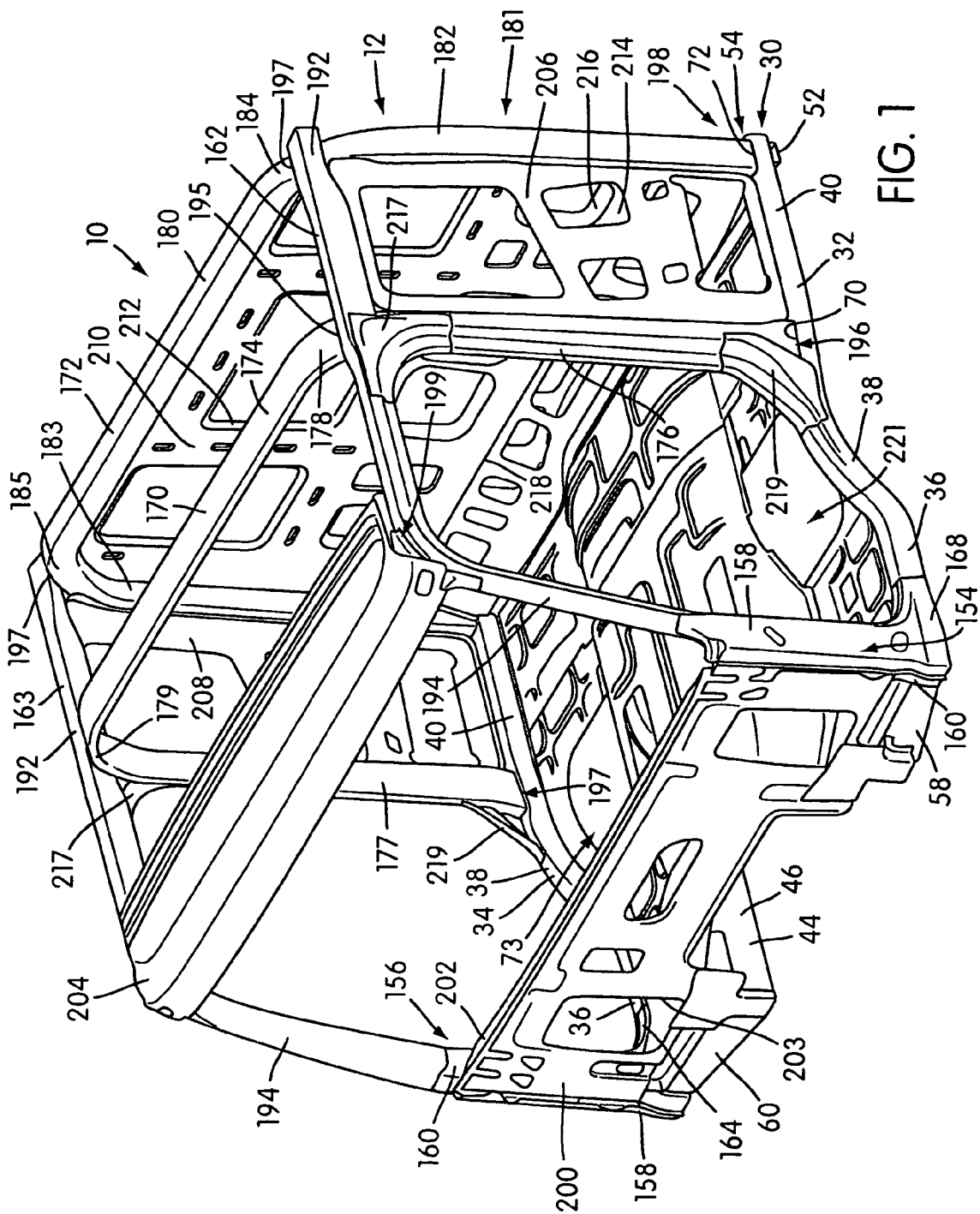
FIG. 1 is a perspective view of a space frame for a cab assembly constructed according to the principles of one embodiment of the present invention for a truck and showing a plurality of body panels of the cab assembly secured to the space frame.

A plurality of panels are mounted on the upper frame assembly 181 (see FIGS. 1 and 4, for example). An upper support assembly 199 is mounted between the upper longitudinal members 162, 163 generally in the area of the junctures between the rail-forming portions 192 and the pillar-forming portions 194 thereof. The upper support assembly 199 may be of multi-piece stamped sheet metal construction (as shown in the example space frame 12) and may be assembled and secured between the upper longitudinal members 162, 163 by welding or other appropriate method.

As seen in FIG. 1, a pair of lower front support structures 200, 202 are mounted between the forward pillar assemblies 154, 156. The lower front support structures 200, 202 may be of stamped sheet metal construction and may be secured to the space frame 12 by welding or other appropriate method. The lower front support structures 200, 202 support a lower edge of a front windshield (not shown) of the cab assembly 10 and provide support structure for a vehicle instrument (or dash) panel (not shown) of the assembled cab assembly 10. The lower front support structure 200 includes a plurality of openings 203, which can be for mounting such items as vehicle headlights.

An upper front support structure 204 is mounted on the upper front support assembly 199. The upper front support structure 204 may be of stamped sheet metal construction (as shown in the example space frame 12) and may be of single- or multi-piece construction (it is multi-piece in the example space frame 12). The upper front support structure 204 may be secured to the upper front support assembly 199 by welding or other appropriate method. The upper front support structure 204 and the upper front support assembly 199 provide support for a forward portion of the roof (not shown) of the cab assembly 10 and for an upper portion of the vehicle windshield.

A pair of side structures 206, 208 (of mirror image construction to one another in the example space frame 12) are mounted to the B and C pillar pairs 176, 182 and 177, 183, respectively, and to the rail portions 40, 192 on each side of the space frame 12. The side structures 206, 208 may be of stamped sheet metal construction (as shown in the example space frame 12) and may be secured to the space frame 12 by welding or other appropriate method.

A pair of upper rear support structures 210, 212 and a pair of lower rear support structures 214, 216 are mounted in the rear of the space frame 12. The structures 210, 212, 214, 216 may be of stamped sheet metal construction and may be secured to the space frame 12 by welding or other appropriate method. The upper rear structures 210, 212 are secured to the leg portions 182, 183 and to the cross portion 180 of the rear U-shaped member 172. The lower rear structures 214, 216 are secured to the cross member 52 and to the lower portions of the leg portions 182, 183 of the U-shaped member 172. The upper and lower rear structures 210, 212, 214, 216 are secured together along seam 218.

A pair of door seal interface structures 217, 219 are mounted on the door opening 221 on each side of the cab assembly 10. Each door seal interface structure 217, 219 may be of stamped sheet metal construction and may be secured to the space frame 12 in the vicinity of joints 196 and 195, respectively, to provide an arcuate transition surface to engage a door seal (not shown) to seal an associated vehicle door (not shown) when the door is closed.

Hydroforming Method

Because many of the structural features of each hydroformed member are formed during a hydroforming operation that creates the same, a preferred method of hydroforming the tubular hydroformed components of the space frame 12 will be considered. A hydroforming operation for forming a tubular hydroformed outer side rail member 32 can be understood from FIGS. 11 and 12. Each hydroformed member (such as a hydroformed U-shaped member 170 or 172, a hydroformed upper longitudinal member 162, 163 or a hydroformed side rail member 32, 34, 42, 44) may be formed from an appropriately shaped tubular blank.

Figure 11:
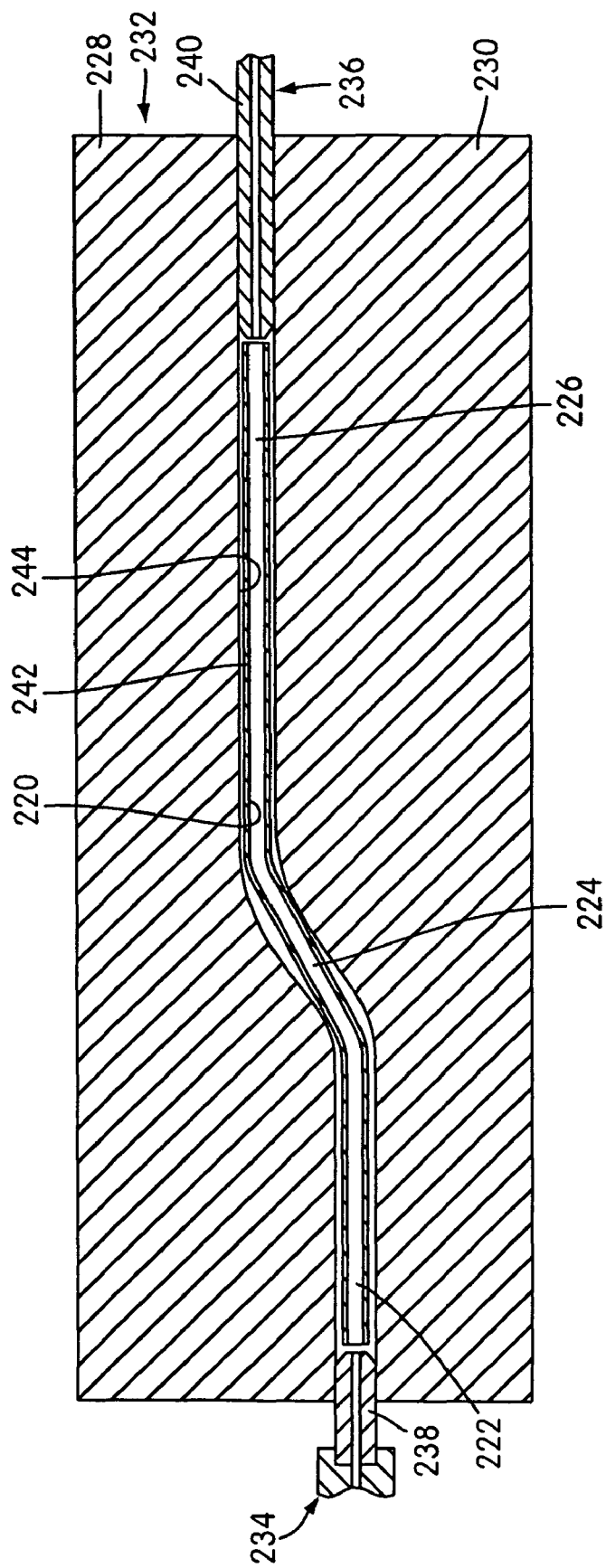
FIG. 11 is a schematic view of a tubular hydroforming die assembly showing a blank mounted therein for forming an outer side rail member of the space frame of FIGS. 1-4.

An example blank 220 for forming the outer side rail member 32 is shown in FIG. 11. The blank 220 is constructed of a suitable metallic material and has a closed transverse cross section and open tubular ends. The example blank 220 is constructed of a suitable grade of steel. Each blank 220 may be formed by any suitable method. For example, a continuous strip of metallic material may be shaped by roll forming into a tube and then seam welded to have a closed transverse cross section. Alternatively, a continuous length of metallic tubing may be formed by extrusion. The continuous tubular structure may then be cut to the length required to form the blank 220.

The blank 220 is bent into an angular shape prior to being placed in a hydroforming die assembly. The blank 220 includes a forward portion 222, an intermediate portion 224 and a rear portion 226. The blank 220 may be bent in a computer numeric controlled ("CNC") bending machine prior to being placed in the die assembly or, alternatively, may be bent by stretch bending to achieve the angular shape. If a relatively "sharp" angle (that is, at an angle greater than 30°) is to be formed in a blank, each sharp angle can be formed according to the teachings of U.S. Pat. No. 5,953,945 entitled METHOD AND APPARATUS FOR WRINKLE-FREE HYDROFORMING OF ANGLED TUBULAR PARTS, which is hereby incorporated herein by reference in its entirety. The teachings of the '945 patent reference can be used to avoid wrinkle formation during the bending operation, particularly on the concave portion of each bend in a hydroformed part. A suitable lubricant may be applied to the exterior of the blank 220 prior to placing it in the die assembly.

After bending, the tubular blank 220 is placed between the die halves 228, 230 of a die assembly 232 and the assembly 232 is closed by bringing the two die halves 228, 230 together. The tubular blank 220 is preferably immersed in a fluid bath so that it is filled with hydroforming fluid (not shown in the schematic representation of FIGS. 11 and 12). A hydroforming ram assembly 234, 236 is engaged with each end of the tubular blank 220 (see FIG. 12, for example) such that a ram member 238, 240 of each assembly 234, 236 seals a respective end of a tubular blank 220. The ram members 238, 240 include hydraulic intensifiers which can intensify the hydroforming fluid, thereby increasing the fluid pressure of the fluid within the blank 220 to irregularly outwardly expand (or deform) the tubular metallic wall 242 of the tubular blank 220 into conformity with the die surfaces 244 of the die cavity (as disclosed, for example, in the '945 patent reference) to thereby form a hydroformed outer side rail member 32 having an exterior surface that is fixed into a predetermined irregular configuration.

The tubular blank 220 may have, for example, an essentially equal diameter, essentially circular cross section along its length prior to outward expansion during the hydroforming process. After hydroforming, the hydroformed member has a cross section that is determined by the shape of the die cavity. The shape of each die cavity used to form the outer side rail member 32 thus corresponds to the shape of the exterior surface of the member 32. Altering the cross-sectional configuration of the tubular hydroformed member 32 can be accomplished without departing from the principles of the present invention, however.

The hydroforming process may be computer controlled. The flow of the hydroforming fluid may be controlled to control, in turn, the manner in which the metallic material of the blank 220 expands (in a radial direction) during the hydroforming process. The ram members 238, 240 may also be controlled to push axially inwardly on opposite ends of the blank 220 during hydroforming to cause metal flow (in an axial direction) within the blank 220 during outward expansion.

The fluid pressure and the axial pressure can be applied and controlled independently of one another. The ends of the tubular blank 220 may be pushed axially inwardly during outward expansion to maintain the wall thickness of the fully formed hydroformed member to within a predetermined range of the wall thickness of the initial tubular blank 220. The ram members 238, 240 may be operated, for example, to maintain the wall thickness of the outwardly expanding wall portions of the blank 220 so that the wall thickness of the resulting hydroformed member is within about +/−10% of the original wall thickness of the blank 220 (i.e., to compensate for wall thinning during diametric outward expansion of the tube).

If holes are to be formed in the member 32, the holes may be formed while the member 32 is in the die assembly 232 during the hydroforming operation or may be formed after the hydroformed member 32 is removed from the die assembly along with any other required further processing of the member 32. Holes may be formed during the hydroforming process in a hydropiercing operation as disclosed, for example, in U.S. Pat. No. 5,460,026, which patent is hereby incorporated by reference in its entirety into the present application. Alternatively, holes (such as holes 70 and 72) or notches of various sizes and shapes may be cut (using a laser, for example) in the member 32 after the hydroforming operation is completed and the hydroformed component is removed from the die assembly 232.

As mentioned, openings 70, 72 are cut in the outer side rail members 32, 34 to receive the B and C pillars. The openings 70 for the B pillars are located in the example space frame 12 at the forwardmost end of the rear section 40 of each of the outer side rail members 32, 34. The B pillars are positioned to define the rearward extent of the door opening 221. The openings 72 for the C pillars are at the rearwardmost end of the rearward section 40 of each of the outer side rail members 32, 34. It can be understood from FIG. 1, for example, that the length of the rearward sections 40, 50 of the outer and inner side rail members 32, 34 and 42, 44, respectively determine the distance between the B and C pillars and roughly determine the length of the rear compartment portion (or sleeper compartment-defining portion) 152 of the cab assembly 10. Consequently, the size of the rearward compartment 10 can be varied by varying the length of the rearward sections 40, 50 of the outer and inner side rail members 32, 34, 42, 44 and the length of the rearward portions of the rail forming portions 192 of the upper longitudinal members 162, 163. As mentioned, the rear compartment portion 152 of the cab assembly 10 may be made long enough so that, for example, a sleeper compartment is included in the rear portion of the cab assembly. Furthermore, because the length of the rear cab portion 152 can vary between cab assemblies, the sleeper compartment of a particular cab assembly may be constructed to be any one of a wide range of sizes.

Figure 12:
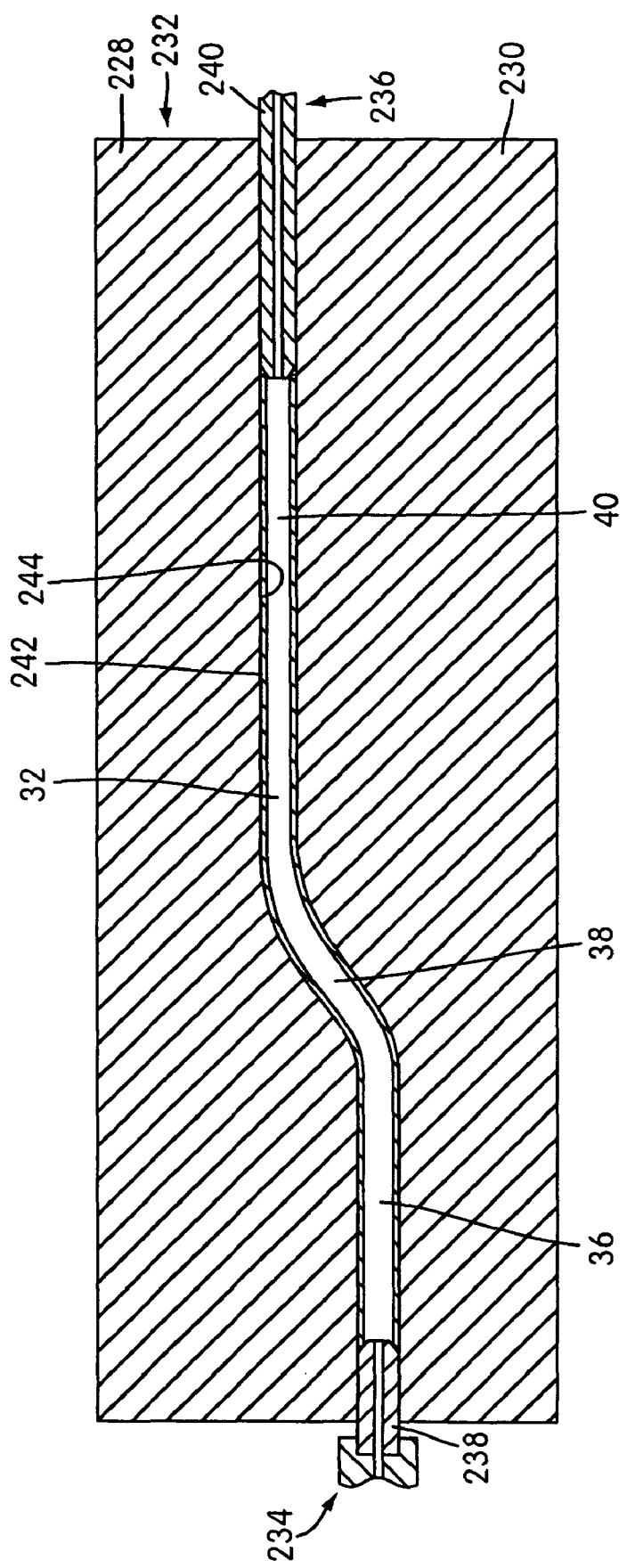
FIG. 12 is a view similar to FIG. 11 except showing the hydroformed outer side rail member within the die cavity.
Figure 13:
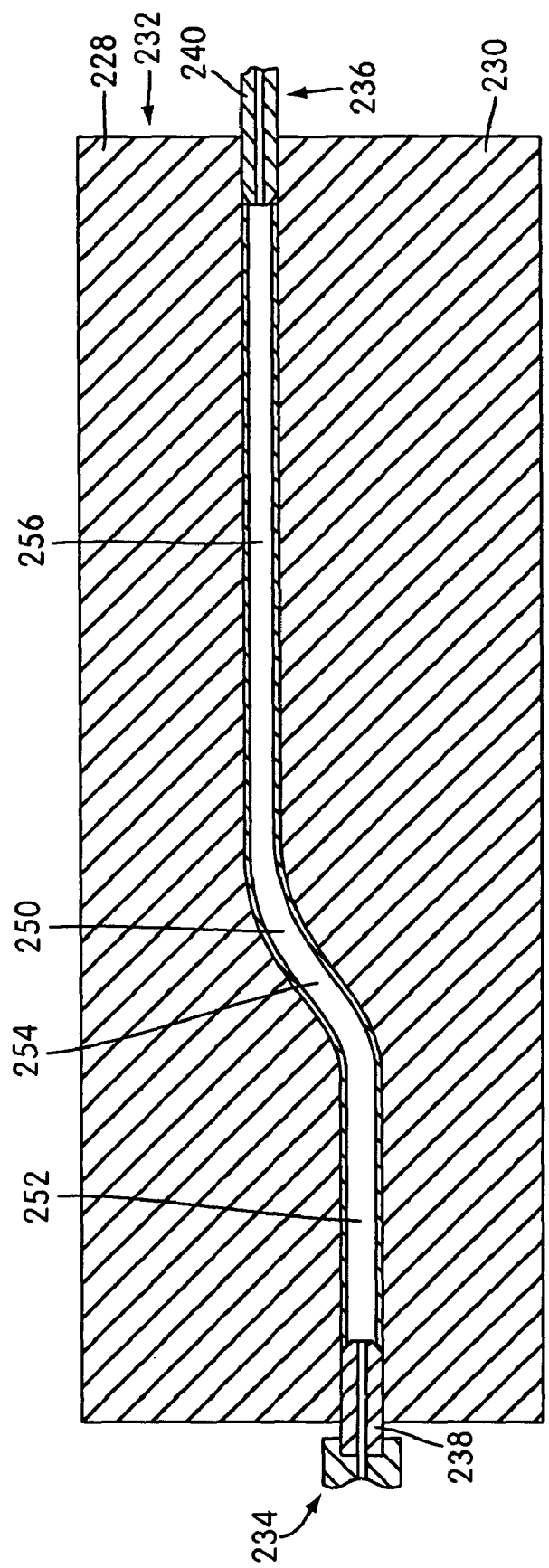
FIG. 13 is a view similar to FIG. 12 except showing another hydroformed outer side rail member in the die cavity that has a longer rearward portion than the hydroformed member shown in FIG. 12.

Tubular hydroforming is particularly well suited for constructing cab assemblies having a wide range of sleeper compartment sizes because a single die assembly can be constructed to enable the production of hydroformed members having a wide range of lengths. More particularly, it can be understood from the discussion of the hydroforming process above that each upper longitudinal member 162, 163, each inner side rail member 42, 44 and each outer side rail member 32, 34 is hydroformed in a respective die assembly. Each die assembly can be constructed to receive blanks having a wide range of lengths so that a single set of hydroforming die assemblies can be used to produce tubular hydroforming parts for constructing cab assemblies having a wide range of lengths. Thus, a single set of die assemblies can produce components for a wide range of cab assemblies, some having no sleeping compartments and others having sleeping compartments of a wide range of sizes. This concept can be understood from, for example, an examination of FIGS. 11-13 which illustrate the use of a single die assembly 232 to produce a relatively short outer side rail member 32 (FIGS. 11 and 12) and to produce a relatively long outer side rail member 250 (FIG. 13).

FIG. 11 shows the blank 220 within the die cavity 244 prior to expansion. FIG. 12 shows the outer side rail member 32 that has been formed from expansion of the blank 220 into conformity with the die cavity 244. Generally, the forward portion 222 of the blank 220 forms the forward portion 36 of the rail member 32, the intermediate portion 224 forms the intermediate portion 38 of the rail member 32 and the rearward portion 226 forms the rearward section 40 of the rearward member 32. FIG. 13 shows the outer side rail member 250 after expansion of the blank from which it was formed (the blank for the member 250 is not shown). It can be appreciated from a comparison of FIGS. 12 and 13 that the forward portions 36 and 252 are of equal length to one another and that the intermediate portions 38 and 254 are of equal length to one another, but that the length of the rearward portion 256 of the outer side rail member 250 is longer than the length of the rearward section 40 of the outer side remember 32. The blank (not shown, as mentioned) from which the outer side rail member 250 is made has forward and intermediate portions that are equal in length to the forward and intermediate portions 36, 38, respectively, of the blank 220 but has a rearward portion that is longer than the length of the rearward section 40 of the blank 220. Thus, the length of the rearward portion of a particular blank used to form an outer side rail member corresponds (approximately) to the desired length of the sleeper compartment-defining portion of the cab assembly being constructed.

The die cavity 244 of the die assembly 232 is shaped to receive blanks of a wide range of lengths to produce rail members having a wide range of corresponding lengths. It can be appreciated that each of the inner side rail members and upper longitudinal members include a rearward portion that defines a length that corresponds to the length of the sleeper compartment of the space frame constructed therefrom. Furthermore, the hydroforming tools 234, 236 are insertable into the respective ends of the die cavity 244 far enough to abut and seal the respective open tubular ends of the blank. Thus, the tool 236 can be inserted far enough to engage the rearward end of a blank regardless of how long the rearward portion thereof is.

It can also be understood that although the rearward sections 40 of the outer side rail members 32, 34 (and the corresponding sections of the die cavity 244 of the die assembly 232) and the insertable portions of the hydroforming tools to 34, 236 are essentially straight, this is not required by the convention. The rearward section of the outer side rail members (and the inner side rail members can see rearward portions of the rail forming portions of the upper longitudinal members) can be arcuate, for example, or some other non-straight shape. Similarly, the portions of the die cavity of the die assembly corresponding to the variable length, non-straight portions and the associated insertable portions of the hydroforming tools can be non-straight as well.

The cab assembly 10 is mounted to the truck frame assembly 18 and moved between its raised and operative positions in a conventional manner. The raising and lowering operation may be power operated or manual. A pair of latch assemblies 282 (shown schematically in FIG. 10) are mounted on the truck frame assembly 18 and releasably engage the pair of latch engaging members 94 of the bracket assemblies 74, 75 of the cab assembly 10 to hold the cab assembly in its operative position. The two pairs of side rail members 32, 34 and 42, 44, the rear cross member 52, the forward connecting structures 58, 60, and the rear U-shaped member 172 provide the cab assembly 10 with a high degree of structural strength which allows the cab assembly 10 to be pivoted to its raised position without deformation.

Other space frame embodiments are possible, however. For example, a space frame for a cab assembly could be constructed in which each upper longitudinal member includes a pillar-forming portion that forms the entire A pillar and an integral rail-forming portion. It is contemplated, for example, when the entire a pillar and roof rail are provided by a single, hydroformed member, to form the upper longitudinal member from a single integral blank or, alternatively, from a blank that is comprised of two tubular metallic structures of different diameter that are welded together end to end to form a blank which would then be bent (optionally) and hydroformed. To construct a blank from two tubular structures of different diameter from one another, for example, and one end of a small diameter blank could be expanded to have a diameter equal to the diameter of the larger diameter blank. The expanded end of the smaller diameter tubular structure could then be butt welded to an end of the larger diameter tubular structure to form a two-piece blank that is bent (optionally) and hydroformed to form an upper longitudinal member.

It is also contemplated to provide a non-hydroformed structure (such as an assembly of stamped sheet metal parts) that forms the entire A pillar. The non-hydroformed A pillar could be connected to a hydroformed upper longitudinal member that provides a roof supporting rail on the associated side of the space frame.

Figure 14:
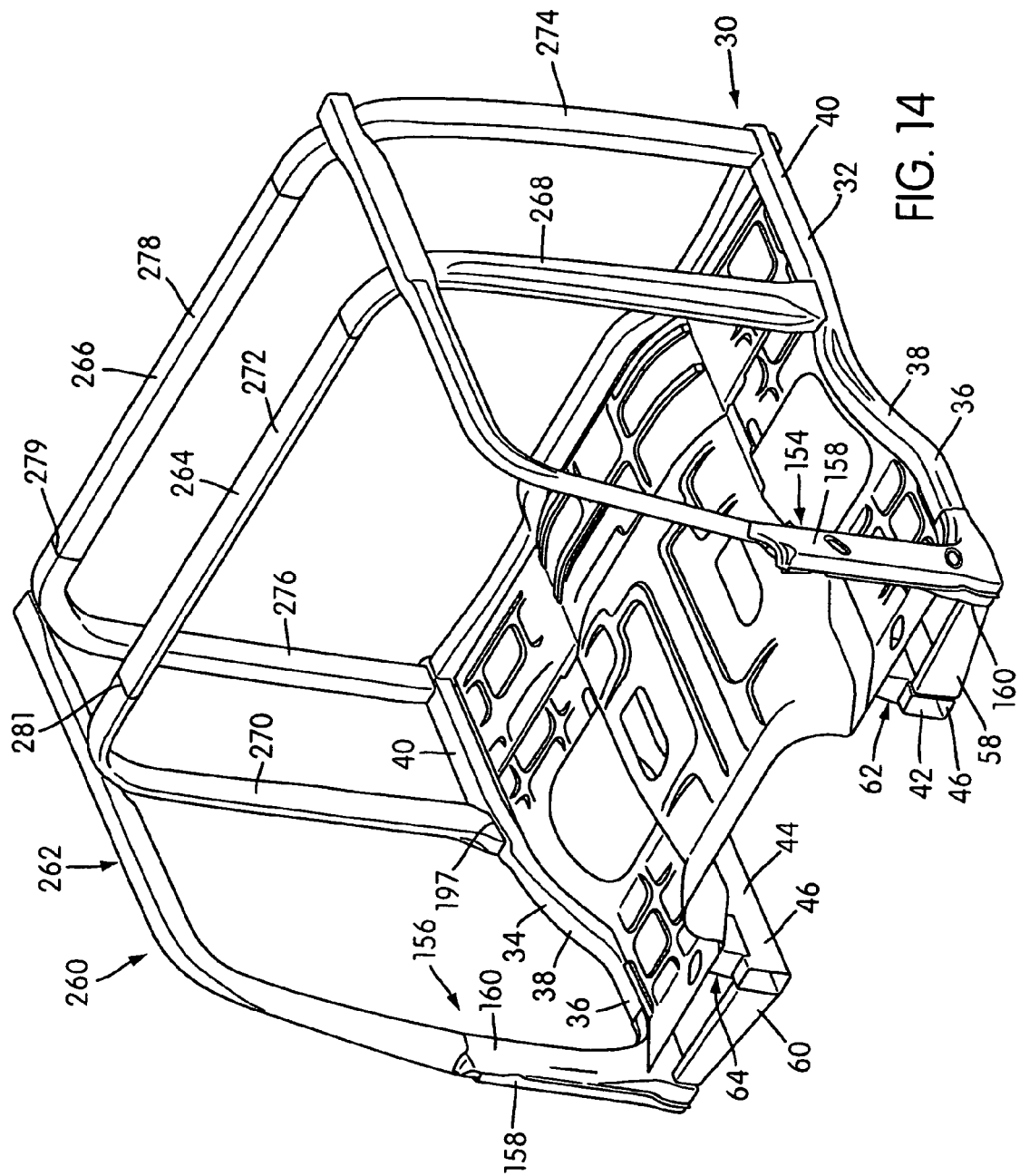
FIG. 14 is another embodiment of the cab assembly.

FIG. 14 shows another example of the space frame 260 for a cab assembly 262. The cab assembly 262 is identical to the cab assembly 10 except for the construction of the intermediate and rearward U-shaped assemblies 264, 266, thereof. Portions of the cab assembly 262 that are identical to corresponding portions of the cab assembly 10 are identified with identical reference numbers and are not separately discussed.

Each U-shaped assembly 264, 266 of the cab assembly 262 is of multi-piece construction as opposed to the one-piece construction illustrated in FIG. 1. Specifically, although any appropriate number of elements can be employed, the assembly 264 includes three elements—a pair of tubular hydroformed leg members 268, 270 and a tubular hydroformed cross member 272. Similarly the U-shaped member 266 includes a pair of tubular hydroformed leg members 274, 276 and a tubular hydroformed cross member 278. The leg members 268, 270 may be identical to one another (so that they may be formed in the same hydroforming die assembly) or they may be of mirror image construction to one another. Similarly the leg members 274, 276 of the U-shaped member 266 may be identical to one another or may be of mirror image construction to one another. Each cross member 272, 278 is telescopically interengaged at each end thereof with one leg member of the associated pair of leg members and is secured thereto by welding at joints 279, 281, respectively.

It should be understood that each of the hydroformed members of the various space frames illustrated herein can be formed as a single, unitary member or as a multi-piece hydroformed member having multiple members that are attached to each other by welding or by other appropriate fastening mechanisms.

The three piece construction of the assemblies 264, 266 allows the hydroformed portion of space frames to be easily and economically constructed to provide cab assemblies having a wide range of widths. More specifically, a space frame can be made relatively wider by making the cross members 272, 278 relatively longer and a space frame can be made relatively narrower by making the cross members 272, 278 relatively shorter. It can be understood from FIG. 14 that the cross members 272, 278 of each assembly 264, 266 constitute the bight portions of the respective U-shaped assemblies. Each cross member may be essentially straight or slightly arcuate. The length of the cross members 272, 278 define the transverse distance between the B pillars and the C pillars, respectively, and consequently determined the width of the cab assembly. The cross member 52 can be constructed to have the length required to span the distance between the rearward cans of the outer side rail members 32, 34.

It can be appreciated from the discussion of the use of the die assembly 232 to form outer side rail members of different lengths that a single die assembly can be used to form cross members 272 or 278, respectively, having a wide range of lengths. It can also be appreciated that when the leg members 274, 276 or 268, 270 are of identical construction to one another, the pairs of leg members 274, 276 or 268, 270 can be formed in the same die assembly.

It should also be understood that in the description of the illustrated embodiment reference to welding to couple elements together is only one possible manner of coupling the elements together and that other fastening mechanisms or fasteners can be used instead of or together with welding. Also, it should be understood that the non-hydroformed members discussed herein can be formed of any non-hydroforming process including stamping and other types of processes. The references to "stamping" and to "stamped" sheet metal construction is made since it is a preferred method of manufacturing the non-hydroformed members in the illustrated embodiment, however, other types of non-hydroforming processes can be employed in the illustrated embodiment.

It can be understood that, while illustrated embodiments of the invention have been disclosed and described with reference with a limited number of embodiments, it will be apparent that variations and modifications may be made thereto without departing from the spirit and scope of the invention. Therefore, the following claims are intended to cover such modifications, variations, and equivalents thereof in accordance with the principles and advantages noted herein.

What is claimed is:

1. A method of forming a space frame for a cab, comprising:

forming each of a pair of hydroformed, longitudinally extending inner side rails, each of a pair of hydroformed, longitudinally extending outer side rails, a hydroformed connecting member, a hydroformed first upper cross member, each of a pair of hydroformed upper longitudinal members, and each of a pair of hydroformed A-pillar members by a method comprising, providing a tubular metallic blank having a tubular metallic wall;

placing the tubular metallic blank into a die cavity of a die assembly, the die cavity having die surfaces, and providing a high pressure fluid into an interior of the blank to expand the metallic wall of the central portion of the blank outwardly into conformity with the surfaces of the die cavity to define the respective hydroformed member;

mounting the connecting member to each of the inner side rails and to each of the outer side rails, wherein the inner side rails are in laterally spaced relation to the outer side rails;

mounting the first upper cross member to said connecting member;

mounting each of the upper longitudinal members to the first upper cross member; and mounting each of the A-pillar members to one of the upper longitudinal members.

2. A method according to claim 1, further comprising mounting each of the A-pillar members to one of the outer side rails.

3. A method according to claim 1, further comprising mounting a mounting structure between a forward end portion of each of the outer side rails and each of the associated inner side rails.

4. A method according to claim 1, further comprising mounting a second upper cross member to the outer side rails.

5. A method according to claim 4, further comprising mounting the second upper cross member to the upper longitudinal members.

6. A method according to claim 1, further comprising mounting a side floor pan structure to each of the outer side rails and the associated inner side rails.

7. A method according to claim 1, further comprising mounting a central floor pan structure to the inner side rails.

8. A method according to claim 1, further comprising mounting an upper support structure to the upper longitudinal members.

9. A method according to claim 1, further comprising mounting an upper support structure to the A-pillar members.

10. A method according to claim 1, further comprising mounting a rear support structure to the first upper cross member.

* * * * *

UNITED STATES PATENT AND TRADEMARK OFFICE
CERTIFICATE OF CORRECTION

PATENT NO. : 7,765,699 B2
APPLICATION NO. : 11/206043
DATED : August 3, 2010
INVENTOR(S) : Brian Corcoran et al.

Page 1 of 1

It is certified that error appears in the above-identified patent and that said Letters Patent is hereby corrected as shown below:

On the title page, item (60) Related U.S. Application Data should read:

--National Stage Entry of PCT/US02/031248, filed on October 1, 2002, which in turn claims priority to provisional application No. 60/326,211, filed on October 2, 2001.--

Signed and Sealed this
Twenty-second Day of March, 2011

David J. Kappos
*Director of the United States Patent and Trademark Office*